June 17, 1930.    J. E. COHEN    1,763,922
SAFETY DEVICE FOR MOTION PICTURE PROJECTING MACHINES
Filed July 9, 1927    3 Sheets-Sheet 1

WITNESSES:

INVENTOR:
Joseph Ellis Cohen,
BY
Joshua R.H. Potts
ATTORNEY.

June 17, 1930.  J. E. COHEN  1,763,922
SAFETY DEVICE FOR MOTION PICTURE PROJECTING MACHINES
Filed July 9, 1927  3 Sheets-Sheet 3
FIG. 3.
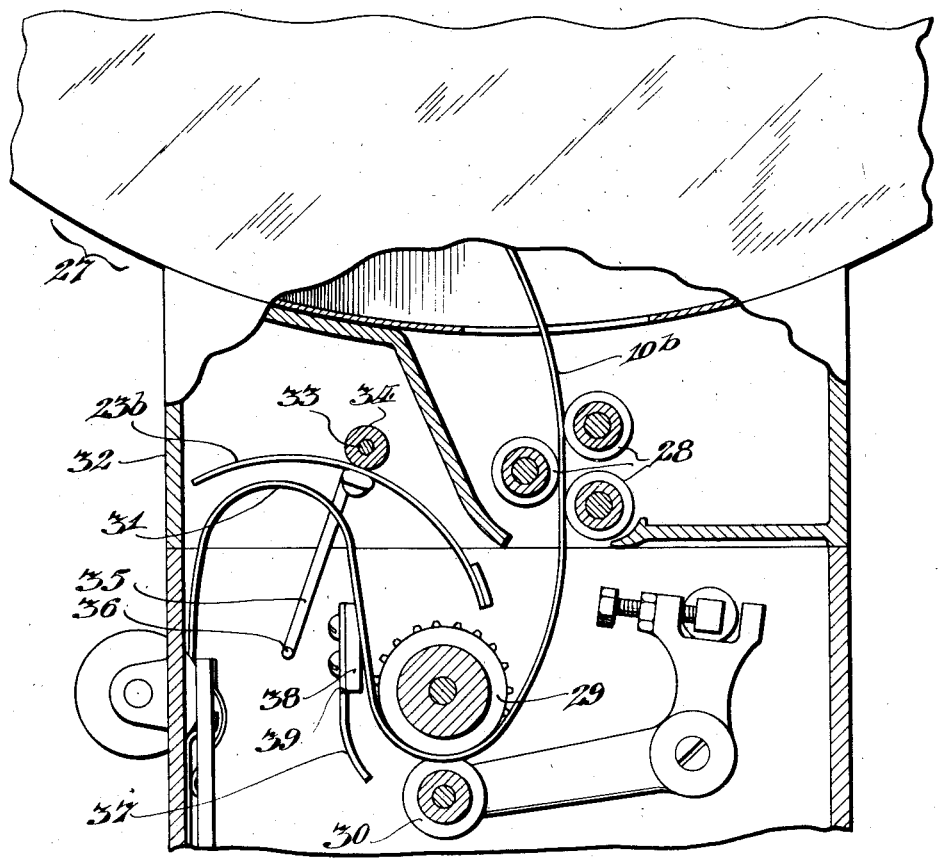
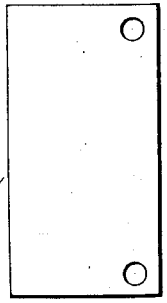
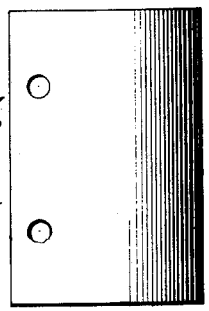
WITNESSES:
Alfred E. Ischinger.
Wesley P. Merrill
INVENTOR:
Joseph Ellis Cohen,
BY
Joshua R. H. Potts
ATTORNEY.

Patented June 17, 1930

1,763,922

UNITED STATES PATENT OFFICE

JOSEPH ELLIS COHEN, OF PHILADELPHIA, PENNSYLVANIA, ASSIGNOR TO SENTRY SAFETY CONTROL CORPORATION, OF PHILADELPHIA, PENNSYLVANIA

SAFETY DEVICE FOR MOTION-PICTURE-PROJECTING MACHINES

Application filed July 9, 1927. Serial No. 204,455.

My invention relates to safety devices for motion picture projectors and more particularly to improvements in fire preventing apparatus having a safety device adapted to swing a dowser plate between the lamp and the film and to stop the projecting mechanism whenever the film in the projector breaks, clogs, or tears. This safety device is actuated by an electro-magnet which is energized when the film makes contact with and closes a switch. One of these switches is located above the aperture plate and the other below the intermittent sprocket.

When the film being run through a projector breaks at certain points, the broken end is very liable to be fed over the top of the loop guard and come into contact with the lamp housing and ignite. When a safety switch, forming a part of a fire preventing apparatus, is mounted on the projector with its actuating plate disposed within the loop guard, the broken end of the film may pass over the loop guard without actuating the switch.

If the ends are lapped too far over one another when mending a broken film, an exceptionally stiff splice is formed which is liable to cause the film to deviate from its usual path and actuate the safety switch when same is mounted on certain projectors.

The object of this invention is to provide means for preventing the end of a broken film from passing beyond the loop guard and for directing it against the plate which actuates the safety switch.

Another object of my invention is to provide means for preventing a stiff splice in a film from causing the film to actuate a safety device.

Still another object is to so design these means that they may be attached to a projecting machine with a minimum of labor and expense.

According to the invention the safety device, which is adapted for use on a picture projector having a swinging loop guard and a switch on said guard for actuating a safety device which closes the dowser to shut off the rays of light, comprises a deflector which is stationary and which is secured to the projector and so located that the film cannot pass beyond the loop guard.

The drawings illustrate embodiments of the invention and the views therein are as follows:—

Figure 3 is a fragmentary side view, partially broken open, of still another projector on which fire preventing apparatus and my invention have been installed.

Figures 4, 5 and 6 are plan views of the deflectors shown in Figures 1, 2 and 3 respectively.

Figure 1:
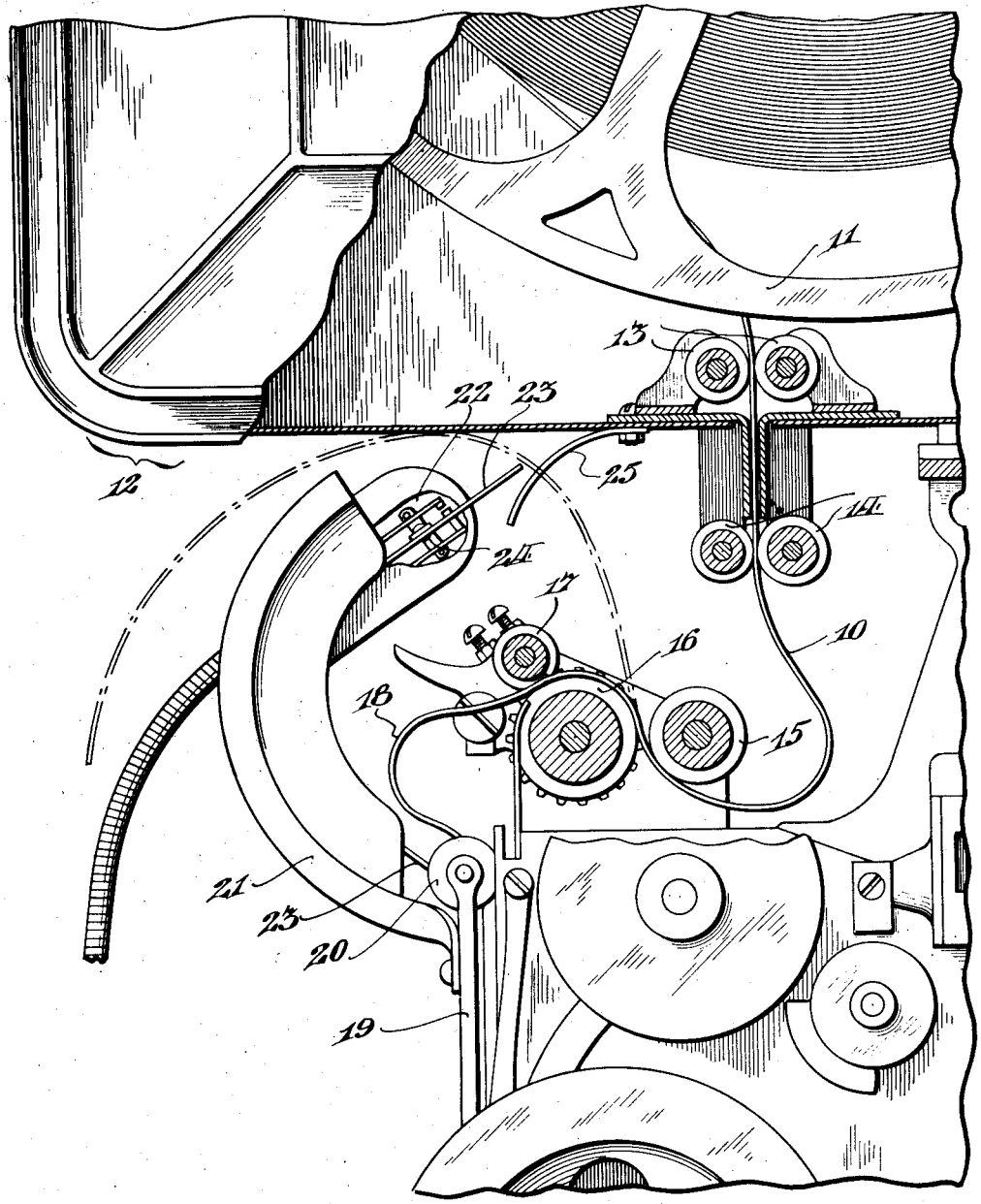
Figure 1 is a fragmentary side view, partially broken open, of a projecting machine on which fire preventing apparatus and my invention have been installed.

Referring to Figures 1 and 4, the film 10 is shown as being led from the reel 11, mounted in upper magazine 12, downwardly between guide rollers 13 and 14, under idler roller 15, over sprocket 16, against which it is held by sprocket roller 17, and drawn outwardly to form a loop 18; after which it is carried downwardly across the aperture plate and threaded over the intermittent sprocket. The gate 19 is then closed so that rollers 20 extend beyond each edge of film 10 and a loop guard 21, fixed to gate 19, aligns with loop 18.

A switch 22 is mounted on one side of loop guard 21 and has a curved plate 23 fixed to its shaft 24 and disposed on the inside of loop guard 21. In case loop 18 should lengthen from any cause or the film break at any point between sprocket 16 and the intermittent sprocket, sprocket 16 will feed the film forwardly and cause it to make contact with curved plate 23, swing same and cause switch 22 to be closed and complete an electrical circuit which actuates the safety device and causes the dowser to intercept the rays of light passing through the film.

If film 10 should break between sprocket 16 and idler roller 15, the broken end might pass upwardly over the loop guard, as shown in dot-and-dash lines in Figure 1, and come in contact with the lamp housing and ignite instead of coming in contact with curved plate 23 and actuating the safety device. In order to eliminate this source of danger, I provide a deflector 25 which is preferably bolted to the bottom of upper magazine 12 and curves forwardly and downwardly so that its forward edge extends beyond the upper end of plate 23. With deflector 25 mounted in this manner, the broken end of this film will be deflected downwardly into contact with the lower part of curved plate 23 and cause same to actuate switch 22, as above described. With a projecting machine equipped with such apparatus and with my deflector, the projecting mechanism will be stopped and the dowser plate swung between the lamp and the film whenever anything happens to the film or when it fails to move at its normal speed, thus positively eliminating all danger of fire from this cause.

Figure 2:
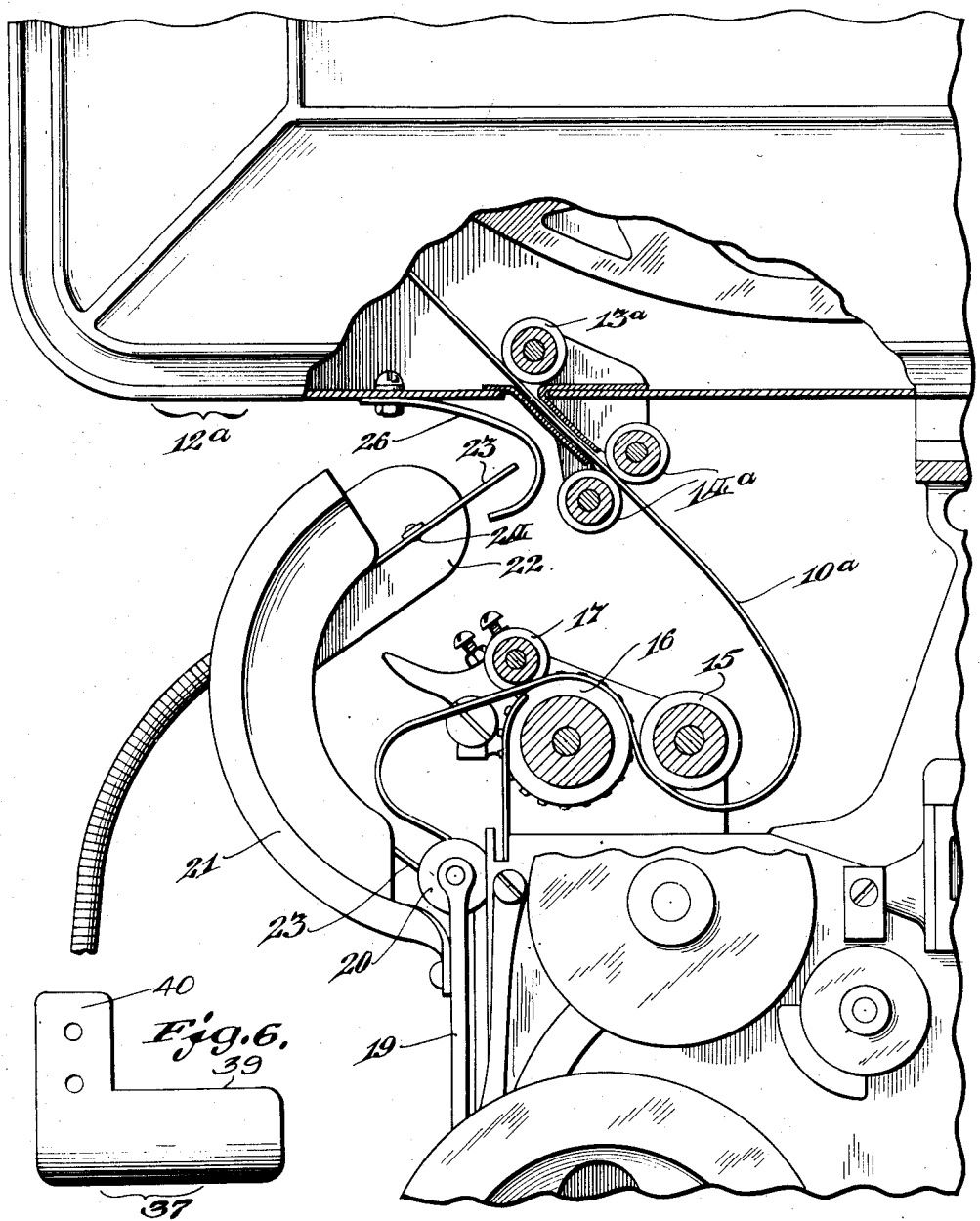
Figure 2 is a view similar to Figure 1 but showing my invention mounted on a projector of a different model, on which fire preventing apparatus has been installed.

Referring now to Figure 2, the deflector illustrated in Figure 5 is shown mounted on a projector similar to the one shown in Figure 1, but having a different magazine, and like parts have been designated by the same numerals in both views, while the exponent "a" has been added to the numerals given similar parts. In this machine, film 10ᵃ passes out of magazine 12ᵃ at a different angle between rollers 14ᵃ and but one roller 13ᵃ is provided. Due to the angle at which film 10ᵃ leaves magazine 12ᵃ, it is necessary to provide a deflector 26 somewhat different from the one provided for the projector shown in Figure 1. In this case, deflector 26 is bolted to the bottom of magazine 12ᵃ at a point above switch 22 and extends rearwardly and then curves downwardly and forwardly so as to partially encircle the upper end of curved plate 23. Its function is exactly the same as that described for deflector 25 and it positively eliminates any danger of film 10ᵃ passing over the upper end of plate 23 and contacting with the lamp housing, as the curved portion of the deflector extends rearwardly into close proximity with the lower roller 14ᵃ and, even if the broken end of a film should pass between plate 26 and roller 14ᵃ, it would be caught between the deflector plate and the bottom of magazine 12ᵃ.

Referring now to Figure 3, in which the deflector illustrated in Figure 6 is shown mounted on a different projector, it will be noted that the film 10ᵇ passes out of magazine 27 between guide rollers 28 and under a sprocket 29 against which it is held by a sprocket roller 30. A loop 31 is formed in front of sprocket 29 and the film then passes downwardly across the aperture plate.

In adapting fire preventing apparatus to this machine, switch 22 is mounted on the outside of the casing 32 and has its shaft 33 extending therethrough. In this installation, it has been found advantageous to fix a sleeve 34 to shaft 33 and to secure curved plate 23ᵇ to it. Switch 22 has been further modified in this instance by securing a bent rod 35 to sleeve 34 and leading the bent end 36 of same across the casing inside of loop 31 so that, if the film should lag behind enough to eliminate loop 31, it will be drawn against end 36 and switch 22 actuated.

If the film should break at any point above the intermittent sprocket in this machine, sprocket 29 will continue to feed the film from magazine 27 and cause loop 31 to engage curved plate 23ᵇ so that switch 22 is actuated; it being understood that, as soon as the lower end of the film passes the lower sprocket and becomes slack, the lower switch is also actuated and the safety device would undoubtedly be actuated by the lower switch before switch 22 was actuated by the film being fed over sprocket 29, as shown and described in my copending application, Serial No. 204,454, filed on even date herewith.

Film is often broken and some operators are careless in their methods of mending same so that oftentimes the broken ends of the film are lapped so far over one another that an exceptionally stiff splice is formed. Such a splice does not allow the film in loop 31 to follow its natural course but tends to move outwardly from sprocket 29 so that it will contact with end 36 and actuate switch 22 when there is no reason for stopping the machine or for obstructing the light passing through the film.

To overcome this objection, I secure the deflector 37, illustrated in Figure 6, to a lug 38 formed on the side of casing 32 from which it extends downwardly and curves rearwardly so that a stiff splice will be deflected upwardly into the natural path of loop 31. Deflector 37 is shaped as shown in Figure 6 in order to utilize a lug which is formed on the machine and its upper edge 39 is disposed but slightly below the centerline of sprocket 29; deflector 37 being so shaped that film 10ᵇ may pass above edge 39 and at one side of upstanding portion 40 if loop 31 is somewhat shortened. Deflector 37 is so shaped and so positioned in order that it may direct the broken end of film 10ᵇ upwardly against plate 23ᵇ in case the film should break while in contact with sprocket 29 and, in this case, functions in the same manner as deflectors described above.

While I have illustrated certain types of deflectors and have described them as being applied in certain ways to specified parts of certain projectors, it will be understood that various modifications and changes may be made without departing from the invention herein set forth and hereafter claimed.

I claim:—

1. Fire prevention apparatus for motion picture projecting machines having a film loop guard whose upper end terminates short of the bottom of the upper magazine, a switch mounted on said guard and adapted to close an electric circuit for actuating a safety device, an actuator fixed to the switch and extending beyond the end thereof and adapted to be engaged by a broken or clogged film, and means comprising a stationary deflector plate secured to the bottom of the magazine adjacent the actuator for preventing a broken or clogged film from passing over said loop guard and to direct said film against said actuator.

2. Fire prevention apparatus for motion picture projecting machines having a film loop guard whose upper end terminates short of the bottom of the upper magazine, an electric switch on said guard for actuating a safety device, an actuator fixed to the switch and extending outward and beyond the end of said guard and short of the bottom of the upper magazine and adapted to be engaged by a broken or clogged film, and means for preventing the broken or clogged film from passing over said actuator and outside of said loop guard, comprising a stationary deflector secured to the bottom of the upper magazine and adapted to direct the broken or clogged film against said actuator to actuate said switch.

3. Fire prevention apparatus for motion picture machines having a film loop guard whose upper end terminates short of the bottom of the upper magazine, a switch mounted on said guard and adapted to close an electric circuit for actuating a safety device to cut off the light rays from the film, an actuating plate for said switch, and a deflector plate secured to the bottom of the magazine and a short distance from the upper end of the loop guard for directing a broken film or excessively enlarged loop thereof against said actuating plate and preventing its passing over the actuating plate and loop guard.

In testimony whereof I have signed my name to this specification.

JOSEPH ELLIS COHEN.